(12) United States Patent
Park et al.

(10) Patent No.: US 9,422,644 B2
(45) Date of Patent: Aug. 23, 2016

(54) THERMOPLASTIC POLY-ETHER-ESTER ELASTOMER RESIN COMPOSITION AND ELASTIC MONOFILAMENTS PREPARED THEREFROM

(75) Inventors: Sung Keun Park, Daegu (KR); Eun Ha Park, Gumi-si (KR); Nam Ku Moon, Ulsan (KR); Tae Hwan Son, Ulsan (KR)

(73) Assignee: KOLON PLASTICS, INC., Gimcheon-si (KR)

( * ) Notice: Subject to any disclaimer, the term of this patent is extended or adjusted under 35 U.S.C. 154(b) by 457 days.

(21) Appl. No.: 13/980,746

(22) PCT Filed: Aug. 18, 2011

(86) PCT No.: PCT/KR2011/006064
§ 371 (c)(1),
(2), (4) Date: Sep. 17, 2013

(87) PCT Pub. No.: WO2012/099310
PCT Pub. Date: Jul. 26, 2012

(65) Prior Publication Data
US 2014/0017481 A1    Jan. 16, 2014

(30) Foreign Application Priority Data

Jan. 20, 2011 (KR) .................... 10-2011-0006038
Aug. 17, 2011 (KR) .................... 10-2011-0081584

(51) Int. Cl.
| | | |
|---|---|---|
| *D01F 6/86* | (2006.01) | |
| *C08K 3/36* | (2006.01) | |
| *C08K 5/13* | (2006.01) | |
| *C08K 5/34* | (2006.01) | |
| *C08K 5/20* | (2006.01) | |

(52) U.S. Cl.
CPC . *D01F 6/86* (2013.01); *C08K 3/36* (2013.01); *C08K 5/13* (2013.01); *C08K 5/34* (2013.01); *C08K 5/20* (2013.01); *Y10T 428/249921* (2015.04)

(58) Field of Classification Search
USPC ......................................... 428/221
See application file for complete search history.

(56) References Cited

U.S. PATENT DOCUMENTS

| 4,185,003 A * | 1/1980 | Hoeschele ........... C08K 5/3435 |
| | | 524/102 |
| 5,550,190 A | 8/1996 | Hasegawa et al. |
| 6,380,290 B1 | 4/2002 | Bonte et al. |
| 7,074,857 B2 | 7/2006 | Bendler et al. |
| 2008/0249213 A1 | 10/2008 | Park et al. |

OTHER PUBLICATIONS

International Searching Authority, International Search Report for PCT/KR2011/006064.

* cited by examiner

*Primary Examiner* — Lynda Salvatore
(74) *Attorney, Agent, or Firm* — Sughrue Mion, PLLC

(57) ABSTRACT

The present invention relates to a poly-ether-ester elastomer resin composition and elastic monofilaments prepared therefrom, and more specifically to a thermoplastic poly-ether-ester elastomer resin composition and elastic monofilaments prepared therefrom, wherein the thermoplastic poly-ether-ester elastomer resin composition is prepared from a poly-ether-ester block copolymer, a heat stabilizer, a UV absorber, a hindered amine light stabilizer, and porous silica, thereby ensuring excellent perceived quality, spinnability and weavability.

15 Claims, No Drawings

THERMOPLASTIC POLY-ETHER-ESTER ELASTOMER RESIN COMPOSITION AND ELASTIC MONOFILAMENTS PREPARED THEREFROM

CROSS REFERENCE TO RELATED APPLICATIONS

This application is a National Stage of International Application No. PCT/KR2011/006064 filed Aug. 18, 2011, claiming priority based on Korean Patent Application Nos. 10-2011-0006038 filed Jan. 20, 2011 and 10-2011-0081584 filed Aug. 17, 2011, the contents of all of which are incorporated herein by reference in their entirety.

TECHNICAL FIELD

The present invention relates to a thermoplastic poly-ether-ester elastomer resin composition and an elastic monofilament prepared therefrom.

BACKGROUND ART

A polyester elastomer is referred to as a thermoplastic elastic material having an ester type chain structure. A polyester elastomer is an intermediate material of rubber and plastic, which has flexibility and elasticity equal to those of vulcanized rubber, and which can be formed into a product by molding a general thermoplastic material such as polyethylene, polypropylene, polyamide, polyester or the like without performing a conventional vulcanizing process for preparing vulcanized rubber.

Generally, vulcanized rubber is formed by vulcanizing a natural low-viscosity rubber material or an artificially synthesized low-viscosity rubber material. However, such a rubber material exhibits excellent flexibility and elasticity, but is problematic in that its molding process is very complicated, its stability is poor and it cannot be easily recycled because it is a thermosetting material. Therefore, it has been required to develop novel materials that can overcome the above problems. In accordance with such a requirement, various kinds of thermoplastic elastomers (TPEs) such as styrene-based elastomers (first developed), urethane-based elastomers, olefin-based elastomers, amide-based elastomers and the like have been developed.

Among these thermoplastic elastomers, a polyester elastomer is a material developed earlier than other materials, and is known to be generally excellent in terms of performance and stability compared to other thermoplastic elastic materials. However, recently, the level of long-term use characteristics, such as durability, weatherability and the like, required in various uses, has become high, and excellent mechanical properties similar to those of engineering plastics have been required.

As an application example of such a polyester elastomer, there is an elastic monofilament. Generally, elastic monofilaments are most widely used to prepare spandex containing polyurethane as a substrate. Spandex is widely used in the fields of clothing to industry. However, application examples of a poly-ether-ester elastic monofilament is not frequent because its elasticity is lower than that of a polyurethane elastic monofilament, but is expected that it will be advanced because it has excellent mechanical properties, heat resistance, chemical resistance and the like.

When an elastic monofilament is prepared using a poly-ether-ester elastomer, it exhibits excellent chemical resistance compared to an elastic monofilament prepared using a general polyurethane resin. However, an elastic monofilament prepared by only a resin itself without special prescription is disadvantageous in terms of long-term durability.

As examples of attempts to improve the durability of a poly-ether-ester elastomer, U.S. Pat. No. 3,723,427 proposes tris(hydroxybenzyl)cyanurate as a sterically-hindered phenol-based primary stabilizer. Further, U.S. Pat. No. 3,758,579 proposes a thioester-type secondary stabilizer and discloses a method of mixing a thioester-type secondary stabilizer with a phenol-based primary stabilizer. Thereafter, similar technologies for improving stability by mixing such primary and secondary stabilizers to cause a synergistic effect were disclosed in U.S. Pat. Nos. 3,996,675, 4,414,408, etc. Among them, U.S. Pat. No. 4,069,200 discloses a technology for improving the durability of a polyolefin resin by independently using a sterically-hindered phenol-based primary stabilizer such as 6-tertiary-butyl-2,3-dimethyl-4-(dimethylaminomethyl)-phenol, 6-tertiary-octyl-2,3-dimethyl-4-(dimethylaminomethyl)-phenol, 6-tertiary-butyl-4-(dimethylaminomethyl)-5,6,7,8-tetrahydro-1-naphthol, 5-tertiary-butyl-2,3-dimethyl-4-hydroxybenzylphosphonate or the like, or by mixing the sterically-hindered phenol-based primary stabilizer with a thioester-type secondary stabilizer such as dilaurylthiopropionate, distearylthiopropionate or the like. U.S. Pat. No. 4,185,003 discloses a technology for improving the stability of a co-poly-ether-ester resin by mixing a phenolic antioxidant such as N,N'-hexamethylene-bis(3,5-di-t-butyl-4-hydroxyhydrocinnamamide), N,N'-trimethylene-bis(3,5-di-t-butyl-4-hydroxyhydrocinnamamide) or the like with a sterically-hindered amine photostabilizer such as bis(1,2,2,6,6-pentamethyl-4-piperidinyl)-n-butyl-(3,5-di-t-butyl-4-hydroxybenzyl)malonate, bis(2,2,6,6-tetramethyl-4-piperidinyl), bis(3,5-di-t-butyl-4-hydroxybenzyl)malonate or the like. U.S. Pat. No. 4,405,749 discloses a technology for improving the stability of a polyester resin by using trimester compounds of 1,3,5-tris-(2-hydroxyethyl)-s-triazine-2,4,6-(1H,3H,5H)trione and 3,5-di-t-butyl-4-hydroxy hydrocinnamic acid. Further, Japanese Examined Patent Application Publication No. 88-38371 discloses a method of preparing a stabilizer containing a large amount of a 2,2,4-trimethyl-1,2-dihydroquinoline dimer, Japanese Examined Patent Application Publication No. 88-40817 discloses a method of mixing a 2,2,4-trimethyl-1,2-dihydroquinoline compound with a phenothiazine compound, and Japanese Examined Patent Application Publication No. 88-40819 discloses a method of improving stability by mixing a 2,2,4-trimethyl-1,2-dihydroquinoline compound with a mercapto compound such as 2-mercaptobenzoimidazole, 2-mercaptomethylbenzoimidazole or the like.

However, when a thermoplastic poly-ether-ester elastomer, unlike polyethylene terephthalate or polybutylene terephthalate, is thermally decomposed, its polyol portion, which is a soft segment, is first decomposed to produce formic acid, and the produced formic acid accelerates the decomposition of the thermoplastic poly-ether-ester elastomer. In this case, in order to prevent the acceleration of the decomposition thereof, it is required to capture formic acid. Generally, the capturing of formic acid can be conducted by basic materials, but, among basic materials, amine-based stabilizers are to problematic in that they deteriorate the initial color of a product although they have excellent heat resistance.

Further, when elastic monofilaments prepared using a polyester elastomer are woven and left for a long period of time, they give off a stench that stimulates a consumer's displeasure. This stench is caused by various kinds of volatile inorganic compounds generated by the thermal decomposition of a polyester elastomer during weaving and post-treatment processes. Particularly, in the case of a polyester elastomer, tetrahydrofuran (THF) is one of the main causes of this stench.

As part of the VOC removing technology for perceived quality improvement, a method of synthesizing a silica-based porous material having a uniform pore size distribution using a surfactant as a mold by a sol-gel process was reported in 1992. Thereafter, research into such a silica-based porous material has been conducted. Particularly, since such a silica-based porous material has a large specific area and comparatively high environmental stability, the possibility of the silica-based porous material being practically applied to an adsorbent is high.

When a silica-based porous material is used as an absorbent of non-polar organic materials or volatile organic compounds (VOCs), there are several problems. First, since these materials are non-polar, they cannot be easily removed by adsorption. Second, since a silica-based porous material has hydrophilicity, it first adsorbs water when it is used as an adsorbent, so it is difficult to selectively adsorb organic materials from a mixture of organic materials and water, and it is easily decomposed by water.

Generally, attempts to remove VOCs using such a silica-based porous material place the focus on the removal of various aldehydes generated from building materials and the like. For example, Korean Unexamined Patent Application Publication No. 2002-7010109 discloses a deodorant composition including at least one selected from among hydrazides, azoles and azines as an effective ingredient in order to efficiently remove aldehydes, such as acetaldehyde, formaldehyde and the like, which are bad smell components.

Further, Korean Unexamined Patent Application Publication No. 2000-0072730 discloses a method of removing free formaldehyde remaining in an amino resin such as a urea resin or the like, which is prepared by polycondensing formaldehyde and urea, by adding a predetermined amount of an aqueous ammonium acetate or ammonium bicarbonate solution at a predetermined temperature to convert free formaldehyde into formaldehyde and produce hexamine and an acid.

Further, Korean Unexamined Patent Application Publication No. 1995-006486 discloses an odorless urea adhesive, which does not emit a bad smell, using barium hydroxide [Ba(OH)$_2$] as a catalyst and which can be used in various applications.

Further, Korean Unexamined Patent Application Publication No. 1993-00165 discloses a method of removing free formaldehyde remaining in a formaldehyde resin, including the steps of: introducing ammonium hydrogen carbonate or ammonium carbonate into a formaldehyde resin as a remover for free formaldehyde at a temperature of 40~60° C. after the polycondensing reaction of the formaldehyde resin; stirring the formaldehyde resin for 30 minutes to 1 hour to conduct a free formaldehyde removing reaction; and adding an alkali metal hydroxide such as potassium hydroxide, sodium hydroxide or the like to the formaldehyde resin to adjust the pH of the formaldehyde resin to 7~8.

As described above, there are methods of removing formaldehyde using an ammonium salt or using barium hydroxide as a catalyst. However, these methods are problematic in that they cannot be easily used in processes of preparing an engineering plastic or a thermoplastic elastomer. The reason for this is that it is not easy to treat and store the above-mentioned VOC reducing materials, and it is difficult to directly introduce these VOC reducing materials into the processes of preparing an engineering plastic or a thermoplastic elastomer. Thus, in the present invention, such a problem is solved using a synthetic porous silica material having excellent VOC removal performance.

DISCLOSURE

Technical Problem

An object of the present invention is to provide a poly-ether-ester elastomer resin composition having excellent VOC emission characteristics and excellent mechanical properties.

Another object of the present invention is to provide an elastic monofilament prepared using the poly-ether-ester elastomer resin composition.

Still another object of the present invention is to provide an elastic fabric including the elastic monofilament.

Technical Solution

A first aspect of the present invention provides a poly-ether-ester elastomer resin composition, including: 100 parts by weight of a poly-ether-ester block copolymer; 0.05~2.0 parts by weight of a heat stabilizer; 0.1~2.0 parts by weight of an ultraviolet (UV) absorber; 0.1~1.0 parts by weight of a hindered amine light stabilizer; and 0.05~1.0 parts by weight of porous silica.

In the poly-ether-ester elastomer resin composition, the heat stabilizer may be one or a mixture of two or more selected from the group consisting of 2,2'-m-phenylene bis(2-oxazoline), 4,4'-bis(alpha, alpha-dimethylbenzyl diphenylamine), and N,N'-hexane-1,6-diylbis(3-(3,5-di-tert-butyl-4-hydroxyphenyl propionamide).

The ultraviolet (UV) absorber may be one or a mixture of two or more selected from the group consisting of 2-(2H-benzotriazloe-2-yl)-4-6-bis(1-methyl-1-phenylethyl)phenol, 2-(5-chloro(2H)-benzotriazloe-2-yl)-4-methyl-6-(tert-butyl) phenol, 2-(4,6-diphenyl-1,3,5-triazin-2-yl)-5-(hexyloxy)-phenol, and 2,4-di-tert-butyl phenyl-3,5-di-tert-butyl-4-hydroxy benzoate.

The hindered amine light stabilizer may be selected from the group consisting of a polycondensation product of dibutylamine-1,3,5-triazine-N,N-bis(2,2,6,6-tetramethyl)-4-piperidyl-1,6-hexamethylenediamine and N-(2,2,6,6-tetramethyl-4-piperidyl)butylamine, poly-6-(1,1,3,3-tetramethyl-butyl)amino-s-triazine-2,4-diyl-(2,2,6,6-tetramethyl-4-piperidylimino-hexamethylene-(2,2,6,6-tetramethyl-4-piperidyl)imino, and a mixture thereof.

The porous silica may be synthetic porous silica including an ingredient for capturing total volatile organic compounds (TVOCs), represented by Formula 1 below:

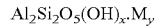

[Formula 1]

wherein M is a metal selected from among P, Ca, Zn, Fe, K, Mn, Mo, Ag, Mg and Ti, x is an integer of 1~5, and y is an integer of 2~7.

The total amount of volatile organic compounds (VOCs), measured by MS300-55, may be 20 ppm or less.

A second aspect of the present invention provides an elastic monofilament prepared using the poly-ether-ester elastomer resin composition.

A third aspect of the present invention provides an elastic fabric comprising the elastic monofilament.

Advantageous Effects

The poly-ether-ester elastomer resin composition according to the present invention is advantageous in that it has excellent workability, it satisfies both flexibility and durability, it has a low VOC content of 20 ppm or less to exhibit high perceived quality, and particularly, it has excellent characteristics as a fabric for car seats.

BEST MODE

Hereinafter, the present invention will be described in detail.

The present invention provides a resin composition prepared by mixing a heat stabilizer for improving durability, an ultraviolet absorber for improving weatherability, a hindered amine light stabilizer for improving weatherability and a deodorant containing porous silica for providing TVOC emission characteristics to improve perceived quality with a thermoplastic polyester elastomer.

That is, the present invention provides a poly-ether-ester elastomer resin composition, including: 100 parts by weight of a poly-ether-ester block copolymer; 0.05~2.0 parts by weight of a heat stabilizer; 0.1~2.0 parts by weight of an ultraviolet (UV) absorber; 0.1~1.0 parts by weight of a hindered amine light stabilizer; and 0.05~1.0 parts by weight of porous silica. The poly-ether-ester elastomer resin composition has a TVOC content of 20 ppm, which was measured based on MS300-55, and exhibits excellent TVOC emission characteristics and good mechanical properties.

The main component of the poly-ether-ester elastomer resin composition is a poly-ether-ester block copolymer. The poly-ether-ester block copolymer may be a thermoplastic poly-ether-ester block copolymer having a structure in which hard segments represented by Formula 2 below and soft segments represented by Formula 3 below are alternately repeated:

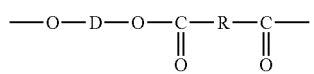

[Formula 2]

wherein D is a radical that is one or a mixture of two or more selected from saturated aliphatic diols and cyclic diols of $C_2$~$C_8$ from which two hydroxy group are removed, and R is a radical that is one or a mixture of two or more selected from aromatic, aliphatic and cyclic dicarboxylic acids having a molecular weight of 500 or less from which two carboxyl groups are removed; and

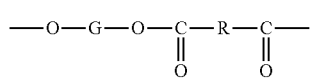

[Formula 3]

wherein G is a radical that is one or a mixture of two or more selected from polyether glycols having a molecular weight of 400~4000 from which two hydroxy group are removed, and R is a radical that is one or a mixture of two or more selected from aromatic, aliphatic and cyclic dicarboxylic acids having a molecular weight of 500 or less from which two carboxyl groups are removed.

The heat stabilizer serves to improve the durability of an elastic monofilament prepared by the poly-ether-ester elastomer resin composition and an elastic fabric including the elastic monofilament, and serves as an antioxidant. As the heat stabilizer, a hindered phenol-based heat-resistant material, such as pentaerythritol, tetrakis-(methylene-(3,5di-tert-buthyl-4-hydroxy phenyl propionate)) or the like, may be used. Specifically, the heat stabilizer may be one or a mixture of two or more selected from the group consisting of 2,2'-m-phenylene bis(2-oxazoline), 4,4'-bis(alpha, alpha-dimethylbenzyl diphenylamine), and N,N'-hexane-1,6-diyl-bis(3-(3,5-di-tert-butyl-4-hydroxyphenyl propionamide)).

In the poly-ether-ester elastomer resin composition, the amount of the heat stabilizer may be 0.05~2.0 parts by weight based on 100 parts by weight of the poly-ether-ester block copolymer, in consideration of durability improvement.

The ultraviolet absorber and the hindered amine light stabilizer serve to provide weatherability. They may be used in combination with each other in order to improve weatherability.

The ultraviolet absorber reduces the amount of UV (photons) absorbed in a polymer, and converts the absorbed UV into weak thermal energy. Examples of the ultraviolet absorber may include 2-(2H-benzotriazloe-2-yl)-4-6-bis(1-methyl-1-phenylethyl)phenol, 2-(5-chloro(2H)-benzotriazloe-2-yl)-4-methyl-6-(tert-butyl)phenol, 2-(4,6-diphenyl-1, 3,5-triazin-2-yl)-5-(hexyloxy)-phenol, and 2,4-di-tert-butyl phenyl-3,5-di-tert-butyl-4-hydroxy benzoate.

In the poly-ether-ester elastomer resin composition, the amount of the ultraviolet absorber may be 0.1~2.0 parts by weight based on 100 parts by weight of the poly-ether-ester block copolymer. When the amount of the ultraviolet absorber is less than 0.1 parts by weight, sufficient weatherability cannot be obtained. Further, when the amount thereof is more than 2.0 parts by weight, it is difficult to discharge a molten material during a spinning process, an elastic monofilament may be cut, and gas may be excessively generated.

The hindered amine light stabilizer serves as a radical scavenger for neutralizing radicals generated by UV attack. Examples of the hindered amine light stabilizer may include a polycondensation product of dibutylamine-1,3,5-triazine-N,N-bis(2,2,6,6-tetramethyl)-4-piperidyl-1,6-hexamethylenediamine and N-(2,2,6,6-tetramethyl-4-piperidyl)butylamine, poly-6-(1,1,3,3-tetramethylbutyl)amino-s-triazine-2,4-diyl-(2,2,6,6-tetramethyl-4-piperidylimino-hexamethylene-(2,2,6,6-tetramethyl-4-piperidyl)imino, and mixtures thereof.

In the poly-ether-ester elastomer resin composition, the amount of the hindered amine light stabilizer may be 0.1~1.0 parts by weight based on 100 parts by weight of the poly-ether-ester block copolymer. When the amount of the hindered amine light stabilizer is less than 0.1 parts by weight, sufficient weatherability cannot be obtained. Further, when the amount thereof is more than 1.0 part by weight, it is difficult to discharge a molten material during a spinning process, and an elastic monofilament may be cut, and gas may be excessively generated.

The porous silica functions to capture smell-causing materials generated at the time of material processing in order to increase the olfactory quality of a material. Particularly, as the porous silica, synthetic porous silica including an ingredient for capturing volatile organic compounds (VOCs) may be used.

Preferably, the porous silica is synthetic porous silica including an ingredient for capturing volatile organic compounds (VOCs), represented by Formula 1 below:

$$Al_2Si_2O_5(OH)_x \cdot M_y \quad \text{[Formula 1]}$$

wherein M is a metal selected from among P, Ca, Zn, Fe, K, Mn, Mo, Ag, Mg and Ti, x is an integer of 1~5, and y is an integer of 2~7.

Since smell-causing materials, which can be generated at the time of processing a material or using a final molded product, are captured in the micropores of the porous silica, they are not discharged to the outside under a general usage environment. In order to improve the ability of capturing such smell-causing materials, the synthetic porous silica including an ingredient for capturing VOCs, represented by Formula 1 above, may be used.

In the poly-ether-ester elastomer resin composition, the amount of the porous silica may be 0.05~1.0 parts by weight based on 100 parts by weight of the poly-ether-ester block copolymer. When the amount of the porous silica is less than 0.05 parts by weight, there is a problem in that the number of micropores or functional groups is very small, and thus it is difficult to exhibit a suitable VOC capturing ability. Further, when the amount thereof is more than 1.0 part by weight, there is a problem in that silica particles are aggregated or formed into a discontinuous phase, and thus an elastic monofilament is cut when it is spun or post-processed.

In order to increase the durability of the poly-ether-ester elastomer resin composition, the above-mentioned stabilizers must be mixed and added in accordance with the characteristics of a resin. In the present invention, these stabilizers are added at the above composition ratio to cause an effect of improving the durability of the poly-ether-ester elastomer resin composition, and thus the long-term durability of a fabric for car seats can be assured when the fabric is formed of the poly-ether-ester elastomer resin composition.

As described above, when the poly-ether-ester elastomer resin composition including such stabilizers is used, high durability based on tensile strength can be realized by twenty times or more compared to when a basic resin composition including no stabilizers is used. That is, the durability of this poly-ether-ester elastomer resin composition is excellent compared to that of a general thermoplastic poly-ether-ester elastomer resin composition.

The thermoplastic poly-ether-ester elastomer resin composition can be applied to elastic monofilaments and elastic fabrics. Particularly, when this poly-ether-ester elastomer resin composition is applied to a fabric for car seats, deterioration of the external appearance or seating performance of the fabric for car seats can be prevented and the appearance quality thereof can be stably maintained even when it is used for a long period of time.

MODE FOR INVENTION

Hereinafter, the present invention will be described in more detail with reference to the following Examples. These Examples are set forth only to illustrate the present invention, and the scope of the present invention is not limited thereto.

EXAMPLES 1 to 7 AND COMPARATIVE EXAMPLES 1 to 6

Thermoplastic poly-ether-ester elastomer resin compositions were prepared according to the components and contents given in Table 1 below.

A specific method of preparing a thermoplastic poly-ether-ester elastomer resin composition is described based on Example 1. 100 parts by weight of a poly-ether-ester block copolymer (KOPE KP3355, surface harness: shore hardness 55 D, Kolon Industries Inc.) and 0.05 parts by weight of synthetic porous silica (Epoclean CS, Taesung Environment Institute Co. Ltd.) including ingredients for capturing VOCs were mixed for 1 hour using a biaxial tumbler.

The surface hardness of the poly-ether-ester block copolymer was measured based on ASTM D-2240, and the unit of the surface hardness thereof is represented by shore D.

Subsequently, based on 100 parts by weight of the poly-ether-ester block copolymer, 0.5 parts by weight of N,N'-hexane-1,6-diyl-bis(3-(3,5-di-tert-butyl-4-hydroxyphenyl propionamide)) and 0.6 parts by weight of 4,4'-bis(alpha,alpha-dimethylbenzyl diphenylamine), each of which is a heat stabilizer as an additive for improving durability, 0.6 parts by weight of dibutylamine-1,3,5-triazine-N,N-bis(2,2,6,6-tetramethyl)-4-piperidyl-1,6-hexamethylenediamine, which is a hindered amine light stabilizer as a weatherability improver, and 0.6 parts by weight of 2-(2H-benzotriazloe-2-yl)-4-6-bis(1-methyl-1-phenylethyl)phenol were added to the mixture of a poly-ether-ester block copolymer and synthetic porous silica, and then melted and kneaded by a twin screw extruder to prepare a poly-ether-ester elastomer resin composition.

In this case, the temperature of the twin screw extruder was set to 150° C., 200° C., 220° C., 230° C. and 250° C. in order of a primary inlet to a die, and the screw rotation speed thereof was set to 230 rpm.

The poly-ether-ester elastomer resin composition was discharged from the twin screw extruder in the shape of a strand, solidified in a cooling bath at 35° C., and then formed into a palletized product by a pelletizer.

The compositions of Examples 1 to 7 and Comparative Examples 1 to 6 are given Table 1 below. Here, Hytrel 5556 (DuPont Corporation) and Vandar 9116 (Ticona Corporation) are used as comparative resins of Comparative Examples 5 and 6, respectively.

TABLE 1

| Class. (unit: parts by weight) | | Poly-ether-ester block copolymer | Heat stabilizer | | Hindered amine light stabilizer | UV absorber | Porous silica | Comparative resin | |
|---|---|---|---|---|---|---|---|---|---|
| | | A | B | C | D | E | F | G | H |
| Ex. | 1 | 100 | 0.5 | 0.6 | 0.6 | 0.6 | 0.05 | 0 | 0 |
| | 2 | 100 | 0.4 | 0.4 | 0.5 | 0.5 | 0.15 | 0 | 0 |
| | 3 | 100 | 0.8 | 0.2 | 0.3 | 0.3 | 0.30 | 0 | 0 |
| | 4 | 100 | 0.3 | 0.3 | 0.3 | 0.3 | 0.50 | 0 | 0 |
| | 5 | 100 | 1.0 | 1.0 | 0.5 | 0.5 | 1.0 | 0 | 0 |
| | 6 | 100 | 0.5 | 0.5 | 1.0 | 1.0 | 0.80 | 0 | 0 |
| | 7 | 100 | 0.8 | 0.8 | 0.7 | 0.7 | 0.80 | 0 | 0 |
| Comp. Ex. | 1 | 100 | 0.1 | 0.1 | 0.1 | 0.1 | 0.009 | 0 | 0 |
| | 2 | 100 | 2.0 | 2.0 | 2.0 | 2.0 | 0.009 | 0 | 0 |

TABLE 1-continued

| Class. (unit: parts by weight) | Poly-ether-ester block copolymer A | Heat stabilizer B | Heat stabilizer C | Hindered amine light stabilizer D | UV absorber E | Porous silica F | Comparative resin G | Comparative resin H |
|---|---|---|---|---|---|---|---|---|
| 3 | 100 | 0.5 | 0.5 | 1.0 | 0.5 | 2.0 | 0 | 0 |
| 4 | 100 | 2.0 | 2.0 | 2.0 | 2.0 | 2.0 | 0 | 0 |
| 5 | 0 | 0 | 0 | 0 | 0 | 0 | 100 | 0 |
| 6 | 0 | 0 | 0 | 0 | 0 | 0 | 0 | 100 | unit: parts by weight
(Composition example)
A: poly-ether-ester block copolymer (KOPE KP3355, surface harness: shore hardness 55D, Kolon Industries Inc.)
B: N,N'-hexane-1,6-diyl bis(3-(3,5-di-tert-butyl-4-hydroxyphenyl propionamide)
C: 4,4'-bis(alpha, alpha-dimethylbenzyl diphenylamine)
D: dibutylamine-1,3,5-triazine-N,N-bis(2,2,6,6-tetramethyl)-4-piperidyl-1,6-hexamethylenediamine
E: 2-(2H-benzotriazloe-2-yl)-4-6-bis(1-methyl-1-phenylethyl)phenol
F: synthetic porous silica (Epoclean CS, Taesung Environment Institute Co. Ltd.) including ingredients for capturing VOCs
G: DuPont Hytrel 5556 (polyester elastomer, shore hardness 55D)
H: Ticona Vandar 9116 (polyester elastomer, shore hardness 57D)

Each of the poly-ether-ester elastomer resin composition prepared in Examples 1 to 7 and Comparative Examples 1 to 6 was dried at 100° C. for 5 hours using a dehumidification-type hot air dryer to remove moisture, and the palletized product was formed into a monofilament of 3500 deniers using a single screw spinning extruder. The physical properties of the monofilament were evaluated by the following method, and the results thereof are given in Table 2.

Specifically, the physical properties of the monofilament were measured as follows.

(1) TVOC (Total Volatile Organic Compound)

The amount of total volatile organic compounds (TVOC) in the monofilament was measured based on MS300-55 which is a test method of Hyundai Motor Company, and the procedure thereof is as follows. First, each sample is cut to a size of 6×5×3 cm, and put into a 3 L Tedlar bag. Then, 1 L of nitrogen gas in introduced into the Tedlar bag, and then the Tedlar bag is closed with a stopper and put into a dry container. This dry container is put into an oven and heated to 100° C. for 2 hours. Subsequently, the dry container is taken out from the oven and left at room temperature for 1 hour, and then the Tedlar is filled with nitrogen gas. The TVOC of the Tedlar bag obtained in this way is analyzed using GC-MSD.

(2) Weatherability

The weatherability of the formed monofilament is evaluated based on ISO-105. The evaluation of the weatherability thereof was carried out for 500 hours under the conditions of a Xenon light source, a black panel temperature of 89±3° C., humidity of 50±5% RH and luminance of 60~100 W/m² (300~400 nm). The grade of weatherability is represented by an E value. It is determined that the weatherability of the monofilament is good when E is 5 or less.

(3) Spinnability 50 kg of each of the poly-ether-ester elastomer resin compositions prepared in Examples 1 to 7 and Comparative Examples 1 to 6 is spun by a single screw spinning extruder. In this case, when the monofilament is not cut and its outer diameter is not changed until the work is finished, it is determined that the spinnability of the monofilament is good, and if not so, it is determined that the spinnability of the monofilament is poor.

TABLE 2

| Class. | | TVOC (ppm) | Weatherability (E) | Spinnability |
|---|---|---|---|---|
| Example | 1 | 10.3 | 4.2 | good |
| | 2 | 9.5 | 4.3 | good |
| | 3 | 8.4 | 3.8 | good |
| | 4 | 7.9 | 4.0 | good |
| | 5 | 7.0 | 3.5 | good |
| | 6 | 7.5 | 4.4 | good |
| | 7 | 7.7 | 4.5 | good |
| Comparative Example | 1 | 13.1 | 7.8 | poor |
| | 2 | 42.5 | 6.5 | poor |
| | 3 | 7.3 | 4.5 | poor |
| | 4 | 36.8 | 5.8 | poor |
| | 5 | 23 | 6.5 | good |
| | 6 | 22 | 3.2 | poor |

From the results of measuring the physical properties thereof, as shown in Table 2 above, it can be ascertained that each of the poly-ether-ester elastomer resin compositions of Examples 1 to 7 has a TVOC content of 20 ppm or less, and satisfies both good weatherability and good spinnability.

In contrast, it can be ascertained that each of the poly-ether-ester elastomer resin compositions of Comparative Examples 1 to 6 has a TVOC content of 20 ppm or less, and does not satisfy both of good weatherability and good spinnability.

Consequently, it can be ascertained that the poly-ether-ester elastomer resin compositions of Examples 1 to 7 can be applied to fields requiring good perceived quality and excellent mechanical properties.

The invention claimed is:

1. A poly-ether-ester elastomer resin composition, comprising: 100 parts by weight of a poly-ether-ester block copolymer; 0.05-2.0 parts by weight of a heat stabilizer; 0.1-2.0 parts by weight of an ultraviolet absorber; 0.1-1.0 parts by weight of a hindered amine light stabilizer; and 0.05-1.0 parts by weight of porous silica, wherein the porous silica is synthetic porous silica including an ingredient for capturing total volatile organic compounds and has the following Formula 1:

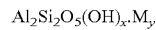

$Al_2Si_2O_5(OH)_x \cdot M_y$   Formula 1 wherein M is a metal selected from among P, Ca, Zn, Fe, K, Mn, Mo, Ag, Mg and Ti,
x is an integer of 1 -5, and
y is an integer of 2 -7.

2. The poly-ether-ester elastomer resin composition of claim 1, wherein the heat stabilizer is one or a mixture of two or more selected from the group consisting of 2,2'-m-phenylene bis(2-oxazoline), 4,4'-bis(alpha, alpha-dimethyl-benzyl diphenylamine), and N,N'-hexane-1,6-diyl bis(3-(3, 5-di-tert-butyl-4-hydroxyphenyl propionamide)).

3. The poly-ether-ester elastomer resin composition of claim 1, wherein the ultraviolet absorber is one or a mixture of two or more selected from the group consisting of 2-(2H-benzotriazloe-2-yl)-4-6-bis(1-methyl-1-phenylethyl) phenol, 2-(5-chloro(2H)-benzotriazloe-2-yl)-4-methyl-6-(tert-butyl)phenol, 2-(4,6-diphenyl-1,3,5-triazin-2-yl)-5-(hexyloxy)-phenol, and 2,4-di-tert-butyl phenyl-3,5-di-tert-butyl-4-hydroxy benzoate.

4. The poly-ether-ester elastomer resin composition of claim 1, wherein the hindered amine light stabilizer is selected from the group consisting of a polycondensation product of dibutylamine-1,3,5-triazine-N,N-bis(2,2,6,6-tetramethyl)-4-piperidyl-1,6-hexamethylenediamine and N-(2,2,6,6-tetramethyl-4-piperidyl)butylamine, poly-6-(1,1,3,3-tetramethylbutyl)amino-s-triazine-2,4-diyl-(2,2,6,6-tetramethyl-4-piperidylimino-hexamethylene-(2,2,6,6-tetramethyl-4-piperidyl)imino, and a mixture thereof.

5. The poly-ether-ester elastomer resin composition of claim 1, wherein a total amount of volatile organic compounds, measured by MS300-55, is 20 ppm or less.

6. An elastic monofilament prepared using the poly-ether-ester elastomer resin composition of claim 1.

7. An elastic fabric comprising the elastic monofilament of claim 6.

8. An elastic monofilament prepared using the poly-ether-ester elastomer resin composition of claim 2.

9. An elastic monofilament prepared using the poly-ether-ester elastomer resin composition of claim 3.

10. An elastic monofilament prepared using the poly-ether-ester elastomer resin composition of claim 4.

11. An elastic monofilament prepared using the poly-ether-ester elastomer resin composition of claim 5.

12. An elastic fabric comprising the elastic monofilament of claim 8.

13. An elastic fabric comprising the elastic monofilament of claim 9.

14. An elastic fabric comprising the elastic monofilament of claim 10.

15. An elastic fabric comprising the elastic monofilament of claim 11.

* * * * *